June 11, 1929.  C. L. WHITE  1,717,176
FRONT WHEEL BRAKE
Filed Oct. 23, 1924
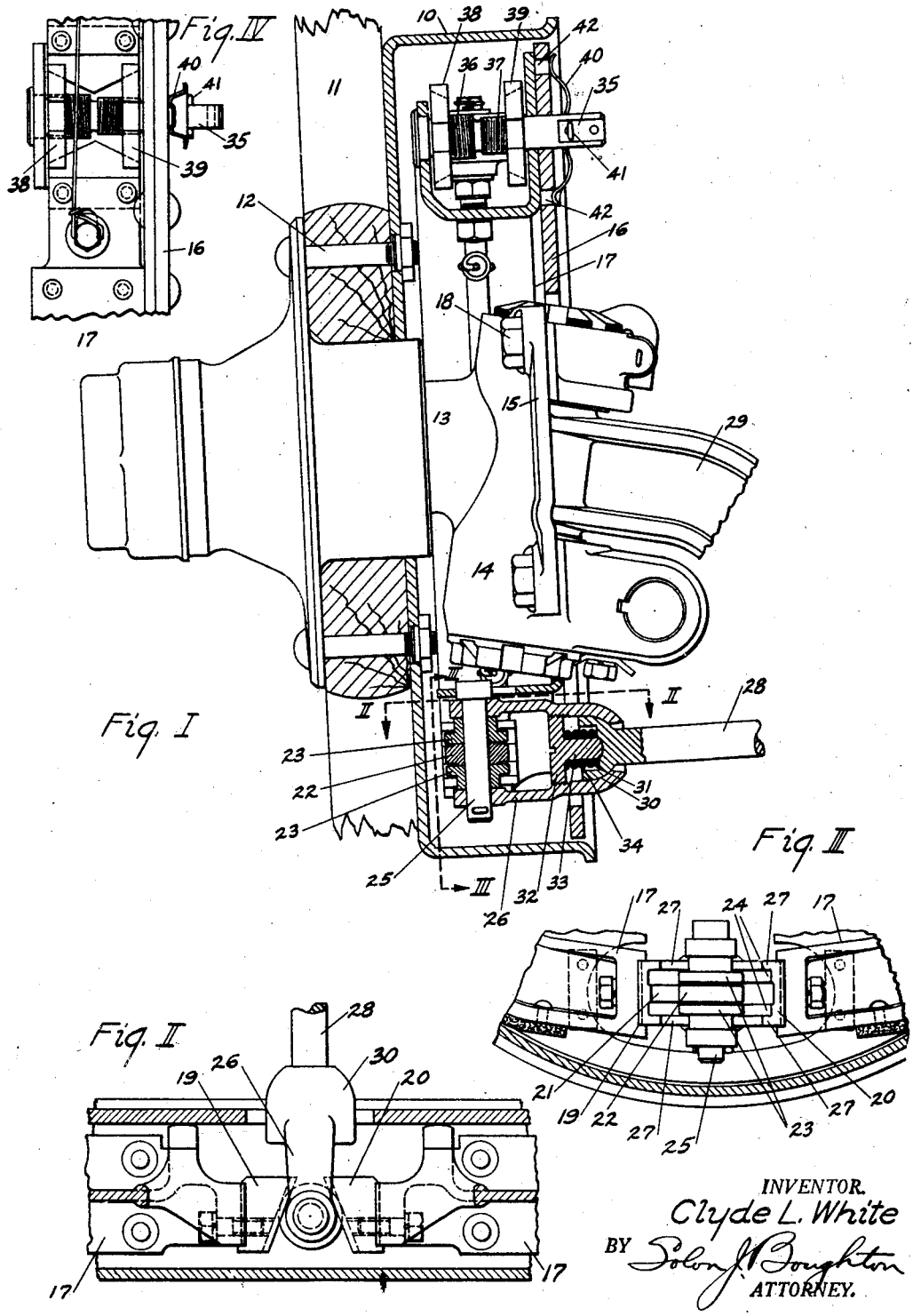
INVENTOR.
Clyde L. White
BY
ATTORNEY.

Patented June 11, 1929.

1,717,176

UNITED STATES PATENT OFFICE.

CLYDE L. WHITE, OF TOLEDO, OHIO, ASSIGNOR TO THE WILLYS-OVERLAND CO., OF TOLEDO, OHIO, A CORPORATION OF OHIO.

FRONT-WHEEL BRAKE.

Application filed October 23, 1924. Serial No. 745,720.

My invention relates to improvements in front wheel brakes for automobiles, of the type in which the spreading of internal brake shoes is accomplished by pull rods acting in a direction approximating a line normal to the plane of the shoes.

The steering knuckle or front wheel pivot is usually set at an angle to the plane of the brake shoes. As a consequence, when the wheels are turned for steering purposes, the vertical angle between the plane of the brake shoes and the pull rod, as well as the horizontal angle, is changed. This tends to produce a binding action between the shoes and pull rod, unfavorably affecting both steering and braking, and in some cases, weakening, bending or even breaking some of the parts.

One of the objects of the invention is to overcome the difficulty just mentioned, by the provision of a universal connection between the pull rod proper and the end portion or head thereof which acts upon the cam end of the shoes.

Another object is the provision of a universal joint for this purpose, which shall be simple and economical to manufacture, and not likely to rattle, which shall permit of swiveling action in addition to universal action, and which shall be capable of transmitting force in either direction longitudinally of the pull rod.

Other objects, and objects relating to details of construction and economies of manufacture, will appear as I proceed with the description of that embodiment of the invention, which, for the purposes of the present application, I have illustrated in the accompanying drawing, in which:

Figure I is a view partly in vertical, transverse section, of a front wheel brake.

Fig. II is a fragmentary, sectional view, taken on line II—II of Fig. I.

Fig. III is a sectional view taken on line III—III of Fig. I, and showing the operating cams and rollers in elevation, and Fig. IV is a top plan view of the brake adjusting means.

Similar reference characters refer to like parts throughout the several views.

In the embodiment which I have illustrated, a conventional brake drum 10 is secured to the wheel 11 in any suitable manner, such as by means of bolts 12. The wheel in turn is conventionally mounted on a spindle 13 carried by a steering knuckle 14. The steering knuckle has on each side, a projecting flange 15 upon which a dust guard and supporting plate 16 for the brake shoes 17 is secured, as by means of bolts 18.

Integral with or bolted on the lower ends of the brake shoes, are operating cams 19 and 20. The cam 19 has a central bearing surface 21 for contact with a roller 22, the portions of the cam on either side of the surface 21 being cut back to clear rollers 23. The cam 20 is cut back centrally to clear the roller 22, and is provided on each side of the cut back portion, with bearing surfaces 24 for engagement with the rollers 23. These rollers 22 and 23 are freely rotatable upon a pin 25 carried in a yoke 26. They are also freely rotatable with respect to each other. Each of the cams 19 and 20 has top and bottom marginal flanges 27 which engage the outer sides of the rollers 23 thus supporting the yoke 26 and its parts and holding it in proper operative position.

28 is a pull rod extending in a direction generally parallel to the major portion of the front axle, a fragment of which is shown in the drawing at 29. In accordance with my invention, this rod is to be attached to the yoke 26 by a universal joint. The preferred form of such joint is illustrated in Fig. I, being what is usually known as a ball and socket joint. The socket portion 30 is preferably integral with the yoke 26 and is formed inside with a bearing surface of substantially spherical contour to receive the ball end 31 of the pull rod 28. Dust and dirt are excluded and the parts of the joint held in position by a threaded plug 32 provided with a central projection 33 having a spherical end which seats against a similarly formed socket in the end of the pull rod. The end of the projection 33 and its seat have a common center which coincides with the center of the spherical surface of the socket 30 and permits a rotary, as well as a bending or turning movement about said center, but at the same time, prevents longitudinal displacement of the yoke or pull rod. Surrounding the projection 33 of the plug 32 and resting against said plug at one end and against the pull rod at the other, is a spring 34 which is provided for the purpose of taking up wear and preventing any rattle in the joint.

At the upper portion of Fig. I, there is illustrated a pin or shaft 35 provided with right and left hand screw-threads 36 and 37, upon which are mounted nuts 38 and 39, which have engagement with the upper ends of the brake shoes. The outer end of the shaft 35 is squared, as shown in order to make it convenient to grasp the same by a tool. A leaf spring 40 is mounted upon the shaft 35, being provided with a squared opening to fit the squared portion of the shaft, and being held inwardly in a condition of tension by a cotter pin 41. The rounded ends of the spring 40, take into holes 42 arranged in a circle in the plate 16, thus holding the shaft 35 in any desired position of adjustment. By the means just described, the upper ends of the brake shoes may be moved toward or away from each other whenever adjustment is necessary, as for instance, to take up wear on the brake lining.

While I have shown and described in considerable detail, a specific embodiment of my invention, it is to be understood that this showing and description are illustrative only and for the purpose of rendering the invention clear, and that I do not regard the invention as limited to the details of construction illustrated and described, except in so far as I have included such limitations within the terms of the following claims.

I claim as my invention:

1. In combination, a front axle, a steering knuckle mounted thereon, a brake shoe, the plane of which is set at an angle to the axis of said knuckle, a cam operatively connected with the shoe, a pull rod, a head for said rod, provided with means for engaging said cam, said head being supported and guided to move in one direction only, and a universal joint connecting said head and rod, said universal joint comprising a pair of parts arranged to transmit longitudinal movement of said rod to said head and adapted to permit relative angular and rotative movement between said rod and said head.

2. In combination, a front axle, a steering knuckle mounted thereon, a brake shoe, the plane of which is set at an angle to the axis of said knuckle, a pull rod, a head thereon, camming means between the head and shoe adapted to move said shoe when the rod is shifted longitudinally, said head being supported and guided to move in one direction only, and a universal joint connecting said head and rod, said universal joint comprising a pair of parts arranged to transmit longitudinal movement of said rod to said head and adapted to permit relative angular and rotative movement between said rod and said head.

3. In combination, a front axle, a steering knuckle mounted thereon, a brake shoe, the plane of which is set at an angle to the axis of said knuckle, a pull rod, a head thereon, camming means between the head and shoe adapted to move said shoe when the rod is shifted longitudinally, said head being supported and guided to move in one direction only, and a ball and socket joint connecting said head and rod, said universal joint comprising a pair of parts arranged to transmit longitudinal movement of said rod to said head and adapted to permit relative angular and rotative movement between said rod and said head.

4. In combination, a front axle, a steering knuckle mounted thereon, a brake shoe, the plane of which is set at an angle to the axis of said knuckle, a pull rod, a head thereon, camming means between the head and shoe adapted to move said shoe when the rod is shifted longitudinally, said head being supported and guided to move in one direction only, and a ball and socket joint connecting said head and rod, said joint being adapted to transmit force in either direction longitudinally of said rod.

5. In combination, a front axle, a steering knuckle mounted thereon, a brake shoe, the plane of which is set at an angle to the axis of said knuckle, a pull rod, a head thereon, camming means between the head and shoe adapted to move said shoe when the rod is shifted longitudinally, said head being supported and guided to move in one direction only, and a ball and socket joint connecting said head and rod, said joint being adapted to transmit force in either direction longitudinally of said rod and to permit relative rotation between said head and rod.

6. In a braking mechanism for a front wheel of a vehicle, the combination of a brake-shoe, actuating means therefor, an operating rod connected to said actuated means and movable in a direction substantially parallel to the normal axis of the wheel, and a universal joint between said rod and said actuating means, the parts of which are capable of transmitting longitudinal movement but permit angular and rotative movement.

7. The combination with a longitudinally movable operating rod for a front wheel brake, of a universal joint comprising a ball and socket adapted to transmit longitudinal movement of said rod and to permit relative angular and rotative movement of the ball and socket.

8. The combination with a longitudinally movable operating rod for a front wheel brake, of a universal joint comprising a pair of mating parts having relative angular and rotative freedom and means for preventing relative longitudinal movement of said parts.

9. The combination with a longitudinally movable operating rod for a front wheel brake, of a ball and socket joint having integral means to prevent longitudinal movement of the ball relative to the socket.

In testimony whereof, I affix my signature.

CLYDE L. WHITE.